(12) United States Patent
De Meo

(10) Patent No.: US 7,386,920 B2
(45) Date of Patent: Jun. 17, 2008

(54) STRAP TIGHTENING DEVICE

(76) Inventor: Leonardo J. De Meo, 2280 Barrister Place, Oakville, Ontario (CA) L6M 3C4

( * ) Notice: Subject to any disclaimer, the term of this patent is extended or adjusted under 35 U.S.C. 154(b) by 62 days.

(21) Appl. No.: 10/885,466

(22) Filed: Jul. 7, 2004

(65) Prior Publication Data
US 2005/0015941 A1    Jan. 27, 2005

Related U.S. Application Data

(60) Provisional application No. 60/484,646, filed on Jul. 7, 2003.

(51) Int. Cl.
*F16G 11/12* (2006.01)
(52) U.S. Cl. ........................................ 24/71.1
(58) Field of Classification Search ................ 52/657; 24/68 R, 68 D, 68 CD, 68 FP, 68 BT, 68 A, 24/71.1; 254/231
See application file for complete search history.

(56) References Cited

U.S. PATENT DOCUMENTS

| | | | | |
|---|---|---|---|---|
| 3,913,727 A | * | 10/1975 | Gruodis | 198/816 |
| D265,170 S | * | 6/1982 | Zukaitis | D8/44 |
| D265,171 S | * | 6/1982 | Zukaitis | D8/44 |
| 4,470,501 A | * | 9/1984 | Wilson | 198/810.01 |
| 4,612,686 A | * | 9/1986 | Bowers | 24/71.1 |
| 5,623,751 A | * | 4/1997 | Knutson | 24/71.1 |
| 5,881,516 A | | 3/1999 | Luedtke | |
| 6,185,898 B1 | * | 2/2001 | Pratt | 52/657 |
| 6,195,848 B1 | * | 3/2001 | Jackson et al. | 24/68 CD |

FOREIGN PATENT DOCUMENTS

| | | |
|---|---|---|
| DE | 35 42 182 A | 4/1987 |
| DE | 39 19 399 C | 9/1990 |
| FR | 2 519 677 A | 7/1983 |

* cited by examiner

*Primary Examiner*—James R Brittain
(74) *Attorney, Agent, or Firm*—Grant Tisdall; Gowling Lafleur Henderson LLP

(57) ABSTRACT

A tightening device for adjusting the degree of tautness of a strapping member. The device comprises: a base; a first member attached to and extending at a first angle from a first side of the base; a second member attached to and extending at a second angle from a second side of the base, the members being in an opposed spaced apart relationship and cooperating with the base to define an interior; a first slot formed in a distal end of the first member with respect to the base, the first slot configured to receive the strapping member therethrough; a second slot formed in a distal end of the second member with respect to the base, the second slot configured to receive the strapping member therethrough in coordination with the opposing slot; and a tightening element configured for coupling the strapping member to the device, the tightening element for collecting and retaining a selected length of the strapping member within the interior; wherein adjustment of the tightening element modifies the length of the strapping member extending between the slots and thereby collected in the interior.

8 Claims, 7 Drawing Sheets

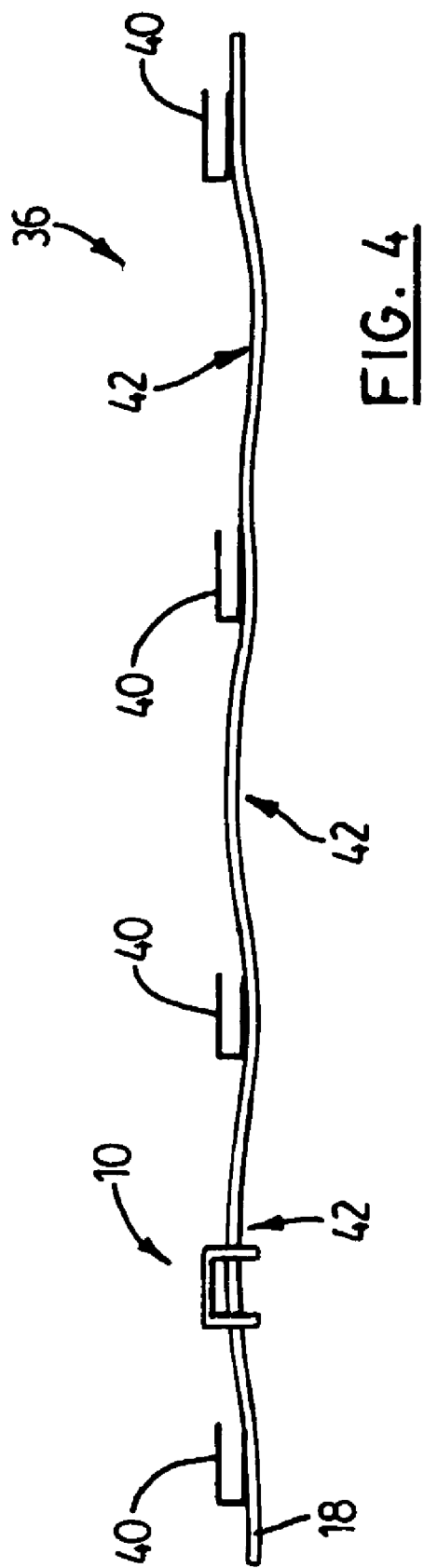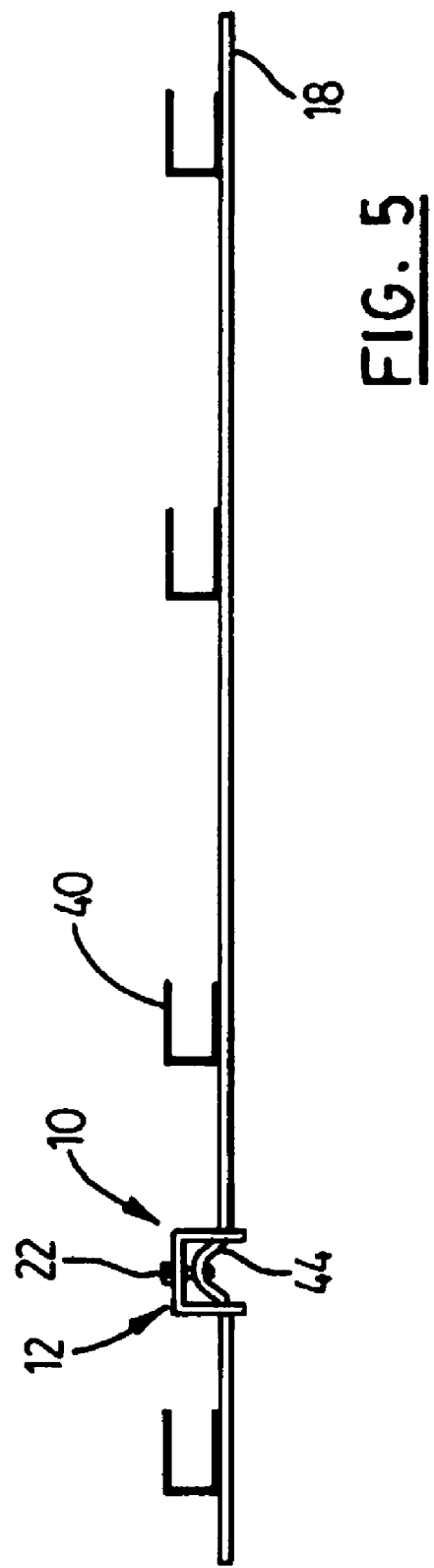

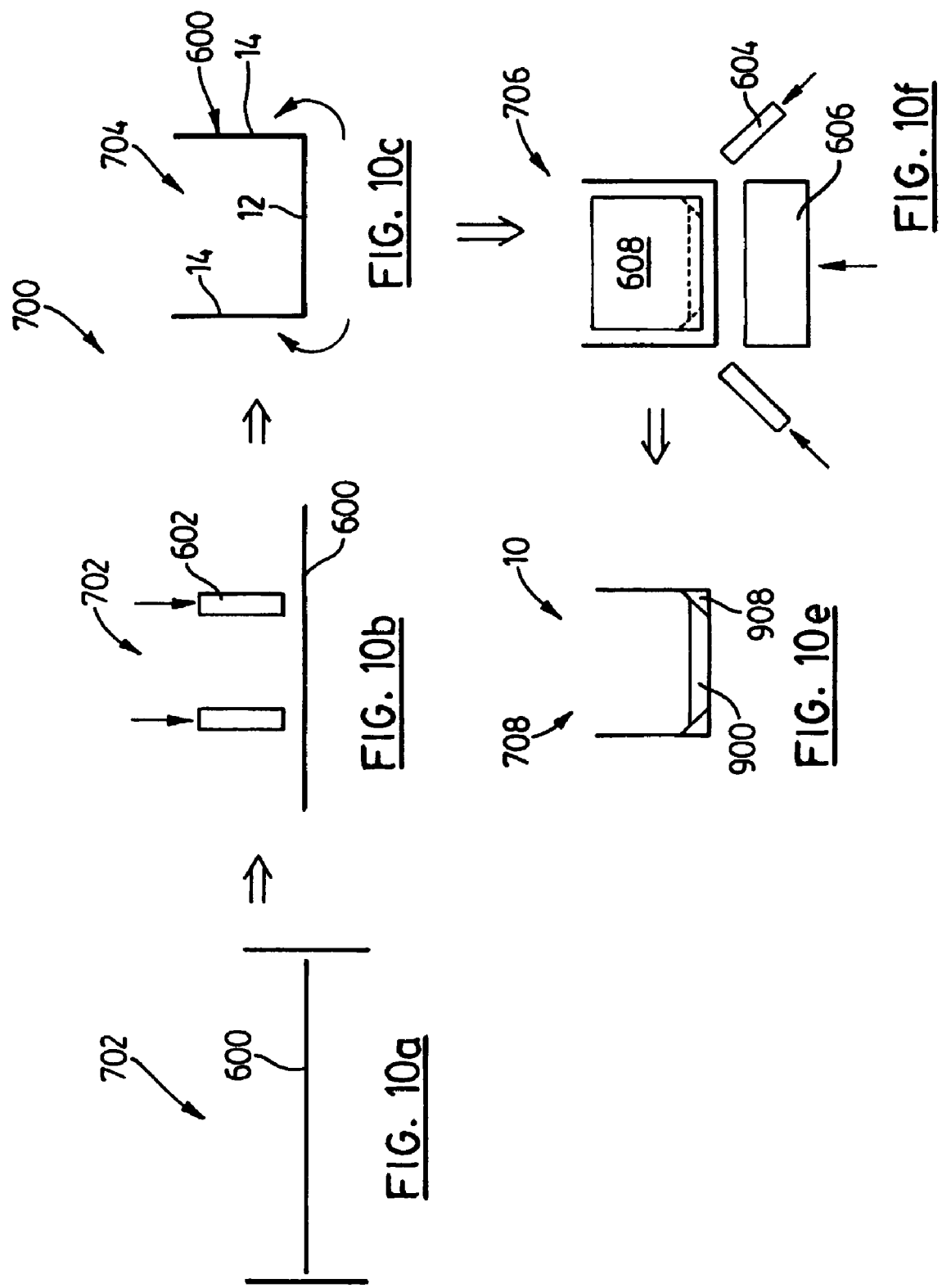

STRAP TIGHTENING DEVICE

This application claims priority from U.S. provisional application Ser. No. 60/484,646, filed Jul. 7, 2003, the contents of which are herein incorporated by reference.

The present invention relates to structural building components, and in particular to bracing elements of frame assemblies for buildings.

BACKGROUND OF THE INVENTION

Residential and commercial buildings contain walls and floors typically assembled as frame assemblies with a series of vertical and horizontal structural members, also known as framing elements. In order for the frame assemblies to withstand vertical and horizontal loading, either static or dynamic, shear braces and/or cladding are typically attached to the framing elements on at least one side of the frame assemblies.

In the case of light framed wall assemblies such as steel framed walls, a flat steel strap known as a flat strap brace is attached on a diagonal (or perpendicular) to the framing elements, thereby increasing the stiffness of the frame assembly to resist lateral and racking loads. These flat strap braces are generally manually attached to opposing corners of the frame assembly, which can lead to undesirable pockets of slack strap material located between the adjacent framing elements. One disadvantage with this installation procedure is that it is difficult to install the flat straps as stretched taut, in order to be effective in resisting any applied loads, and therefore special tools or jigs are commonly used in attaching and thereby pre-tensioning or otherwise making taut the straps on the frame assembly.

One solution for controlling the tautness of diagonal strapping members is given in U.S. Pat. No. 6,185,898 by Pratt. Pratt describes modifying a wall assembly to incorporate a pair of laterally opposed vertical supports, which are used to attach a corresponding strap thereto. Each of the supports have an aperture that is sized to receive the straps by means of a cooperating force distributing member and a strap alignment member. Both members are positioned in the aperture to align and distribute loading from the tensioned straps. However, one disadvantage with Pratt's strapping arrangement is that it requires modification of the adjacent wall framing members to provide appropriate aperture to accommodate the force distributing and strap alignment members.

SUMMARY OF THE INVENTION

It is an object of the present invention to provide a strap tightening device to obviate or mitigate at least some of the above presented disadvantages.

Residential and commercial buildings contain walls and floors typically assembled as frame assemblies with a series of vertical and horizontal structural members, also known as framing elements. In order for the frame assemblies to withstand vertical and horizontal loading, either static or dynamic, shear braces and/or cladding are typically attached to the framing elements with straps on at least one side of the frame assemblies. One disadvantage with current flat strap braces is that it is difficult to install the straps as stretched taut, in order to be effective in resisting any applied loads, and therefore special tools or jigs are commonly used in attaching and thereby pre-tensioning or otherwise making taut the straps on the wall. Contrary to present brace and strap systems, a tightening device is provided for adjusting the degree of tautness of a strap. The device comprises: a base; a first member attached to and extending at a first angle from a first side of the base; a second member attached to and extending at a second angle from a second side of the base, the members being in an opposed spaced apart relationship and cooperating with the base to define an interior; a first slot formed in a distal end of the first member with respect to the base, the first slot configured to receive the strap therethrough; a second slot formed in a distal end of the second member with respect to the base, the second slot configured to receive the strap therethrough in coordination with the opposing slot; and a tightening element configured for coupling the strap to the device, the tightening element for collecting and retaining a selected length of the strap within the interior, wherein adjustment of the tightening element modifies the length of the strap extending between the slots and thereby collected in the interior.

According to the present invention there is provided a tightening device for adjusting a degree of tautness of a strap, the device comprising: a base adapted for connecting to the strap; a first member extending from a first side of the base; a second member extending from a second side of the base, the members being in an opposed spaced apart relationship and cooperating with the base to define a device interior, a first slot located in a distal end of the first member, the first slot adapted to receive the strap therein; and a second slot located in a distal end of the second member, the second slot adapted to receive the strap such that a length of the strap extends between the first slot and the second slot; wherein during use, the strap will be retained within the device interior by connecting the strap to the base, such that the length of the strap extending between the slots is increased.

BRIEF DESCRIPTION OF THE DRAWINGS

These and other features of the preferred embodiments of the invention will become more apparent in the following detailed description in which reference is made to the appended drawings wherein:

FIG. 1b is a perspective top view of the tensioning device of FIG. 1a;

FIG. 3 is a side view of a wall assembly including the device of FIG. 1a;

FIG. 4 is a section view taken at line 4-4 of FIG. 2;

FIG. 5 is a view of the section view of FIG. 4 with the tensioning device in use;

FIG. 6a is an assembled side view of the tensioning device of FIG. 1a;

FIG. 7a is a further embodiment of the device of FIG. 1a;

FIG. 7b is a still further embodiment of the device of FIG. 1a;

FIG. 7c is a still further embodiment of the device of FIG. 1a;

FIG. 7d is a still further embodiment of the device of FIG. 1a; and

FIG. 8 is a still further embodiment of the device of FIG. 1a.

FIG. 9a is a perspective view of a further embodiment of the device of FIG. 1a;

FIG. 9b is a perspective view of another embodiment of the device of FIG. 1a; and FIG. 10 is a manufacturing process of the device of FIG. 1a.

DESCRIPTION OF THE PREFERRED EMBODIMENTS

Figure 1A:
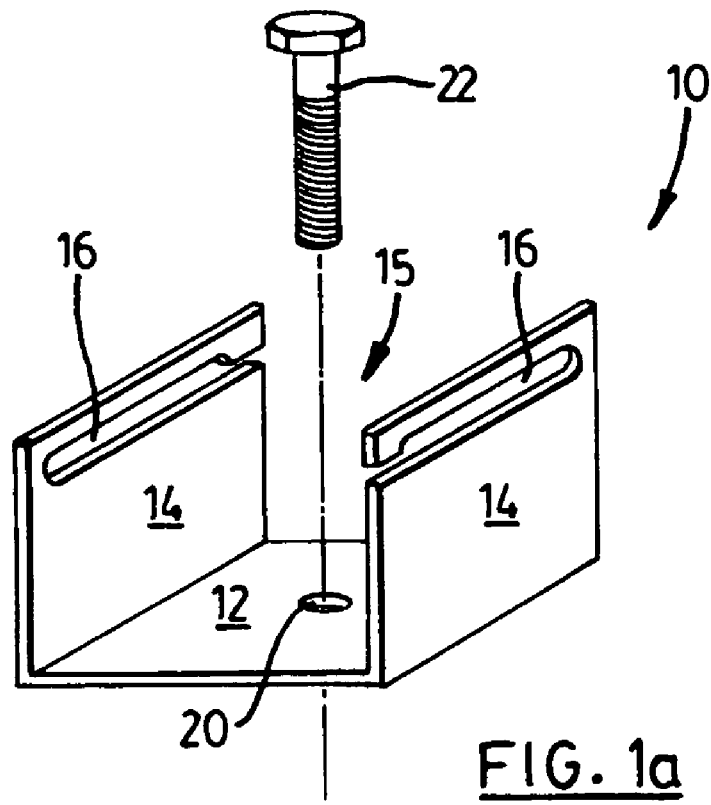
FIG. 1a is a perspective top view of a tensioning device.

Referring to FIG. 1a, a tightening device 10 has a base 12 with a pair of opposing members 14, providing such as but not limited to a U-shaped cross-section, to define an interior 15. Each of the members 14 has a slot 16 through which a strap 18 (see FIG. 1b) is inserted. Opposing sides 19 of the strap 18 can be inserted into corresponding entrances 26 of the slots 16, in order to position the strap 18 in the interior 15. The base 12 has a hole 20 for receiving a fastener 22, such as but not limited to a threaded bolt or screw. It is recognised that the base 12 could also have a marker or dimple (not shown), rather than the hole 20, for aiding the placement of the fastener 22, such as a self tapping screw. It is recognised that the marker/dimple or hole 20 is an example of adapting the base 12 for attaching to the strap 18. Other examples of adaptation could include tolerances such as flatness and dimensions of the base 12 to accommodate gathering of the strap 18 within the interior 15 and attachment to the base 12.

Figure 1B:
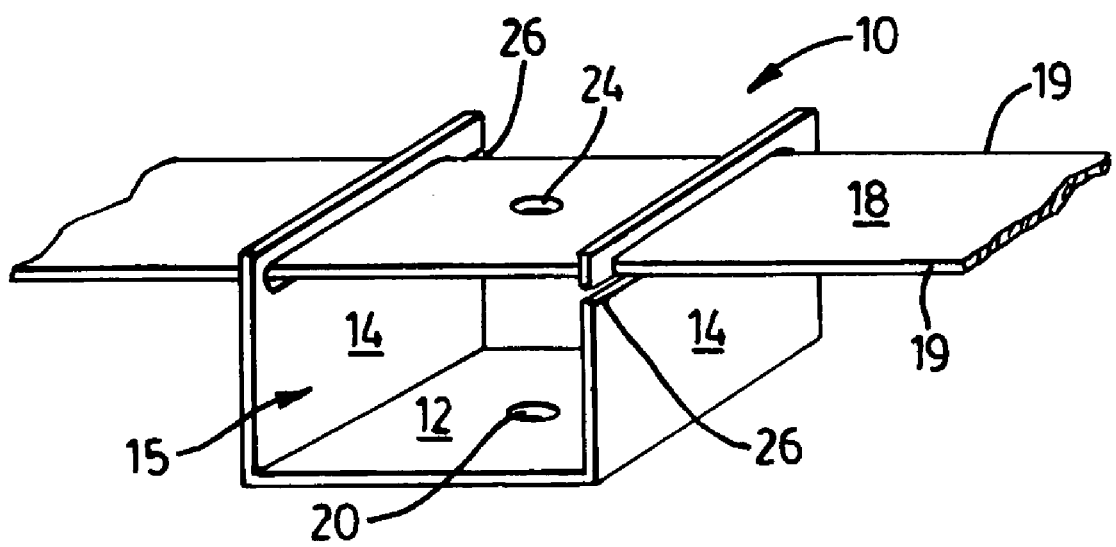
Figure 2:
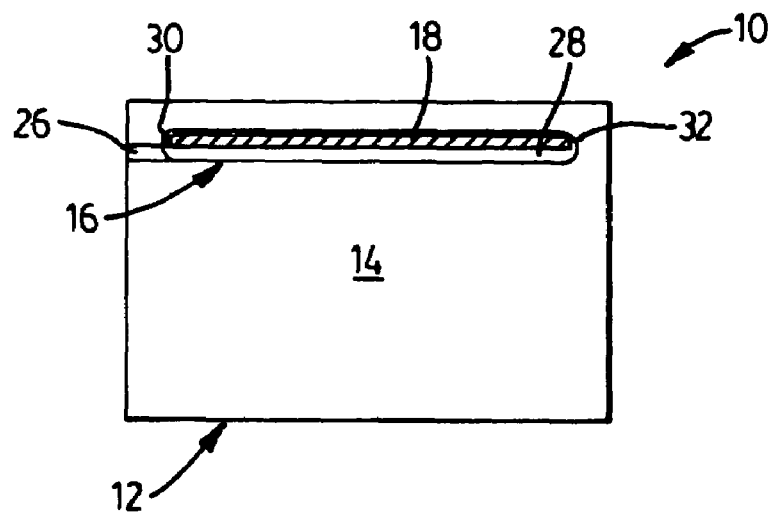
FIG. 2 is a side view of the device of FIG. 1b.
Figure 6A:
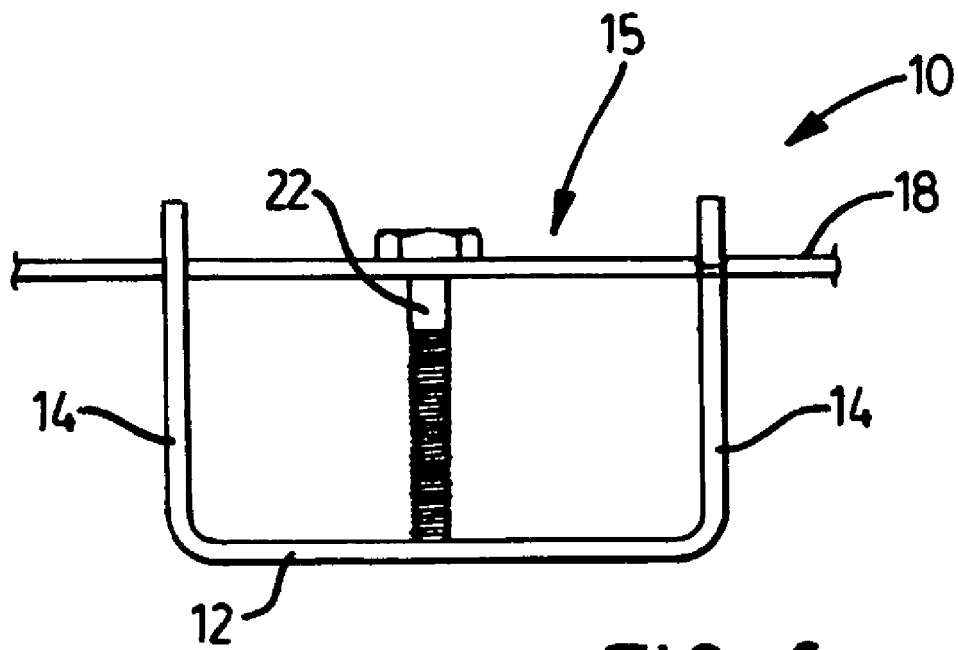
Figure 6B:
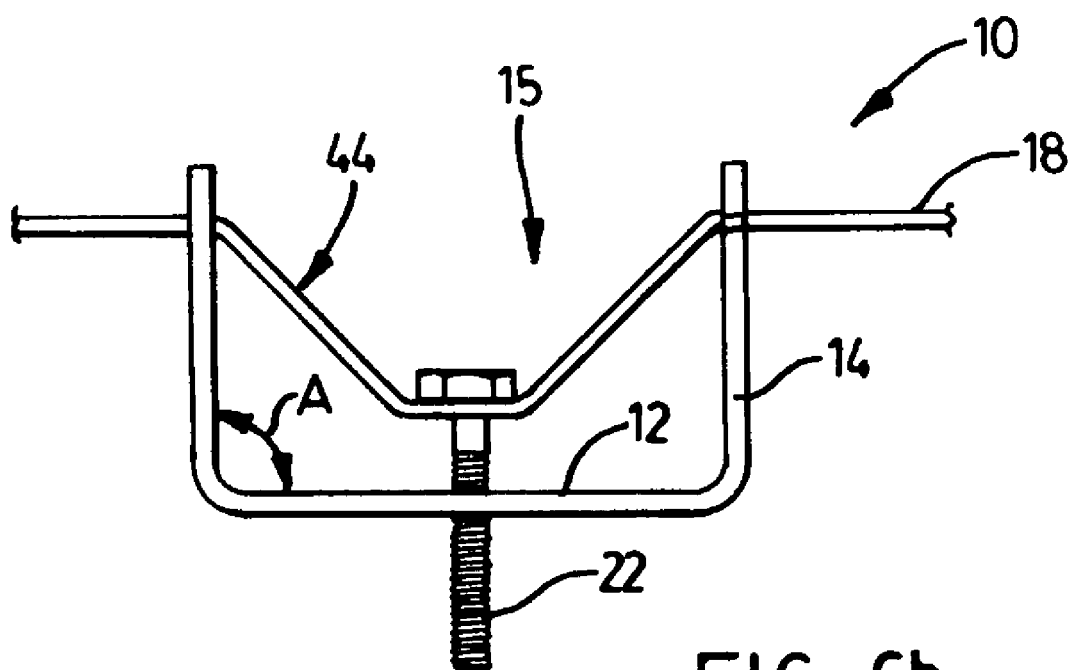
FIG. 6b is a further side view of the tensioning device of FIG. 6a with the tensioning device in use.

Referring to FIG. 1b, a corresponding hole 24 (to hole 20) is formed in the strap 18 to receive the fastener 22 therethrough, in order to gather a portion of the strap 18 in the interior 15 of the device 10 (see FIG. 6b). For example, the hole 20 can be preformed in the base 12 and the hole 24 can be formed in the strap 18 by the fastener 22, such as but not limited to a self tapping screw. It should be noted that the fastener 22 is used as a tightening element for collecting a selected length of the strap 18 in the interior 15 to modify the tightness of the strap 18, as further described below. The device 10 can be manufactured from material such as but not limited to bent sheet metal material formed as a single piece, an assembly of individual components joined through mechanical/metalurgical means (fasteners, welding, adhesive, etc . . . ), molded (such as using plastics material) or cast as a one piece unit, or a combination thereof Referring to FIG. 2, each of the slots 16 of the device 10 has the entrance 26 for providing access of the strap 18 to a slot interior 28. The entrances 26 are in a spaced apart opposed relationship on respective ends of the members 14. The width of the entrance 26 can be less than the slot interior 28 so as to provide a notch 30 or abutment at one end of the slot 16. The notch 30 inhibits the strap 18 from becoming dislodged from the slot 16 once inserted therein, and to assist in holding the device 10 in place once positioned on the strap 18. The slot 16 also has a stop 32 or abutment located at the other end opposite the entrance 26, for inhibiting undesirable rotation of the device 10, when the fastener 22 is rotated during gathering of the strap 18 in the interior 15 (see FIG. 6b). Once the device 10 is positioned on the strap 18 (as shown in FIG. 1b), the stops 32 are contacted by the sidewalls of the strap 18 due to initial rotation of the device 10 during installation of the fastener 22 to the base 12. Once contacted, the stops 32 inhibit further rotation of the device 10 with respect to the strap 18, thereby assisting in holding the device 10 in position during further tightening of the fastener 22. The cooperation of the strap 18 with the stops 32 assists in fastening of the strap 18 to the device 10, such that the device 10 preferably does not have to be continually manually held in position by the installer of the device 10. It is recognised that the configuration of the entrances 26 and stops 32 can be as shown (see FIG. 1a) for a clockwise rotation of the fastener 22, or for a counter clockwise rotation (not shown). It is further recognized the device 10 can also have slots 16 without entrances 26, whereby the strap 18 is threaded sequentially through the opposing slots 16 from one member 14 to the other. However in this case, the slots 16 would have the stops 32 located at both respective ends.

Figure 3:
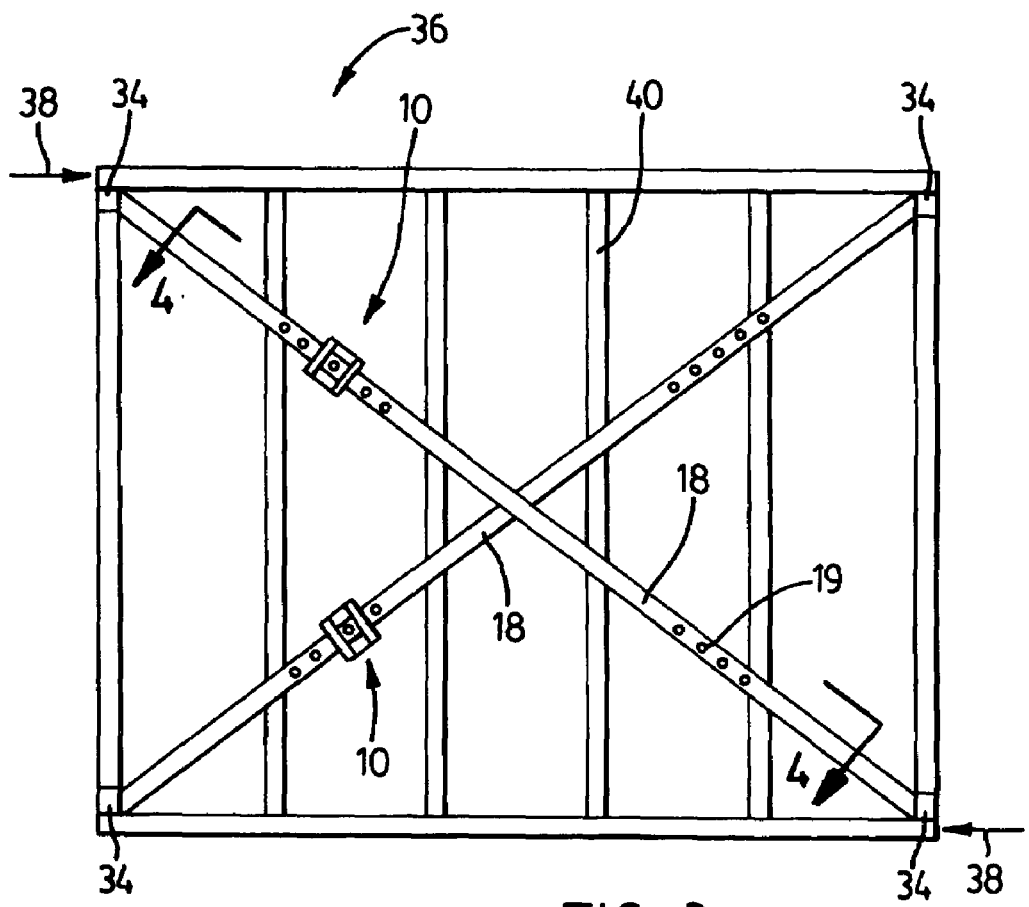

Referring to FIG. 3, a pair of the devices 10 are installed on a corresponding pair of straps 18. First, one end of each of the straps 18 is attached to a respective corner 34 of a frame assembly 36. Then the straps 18 are then pulled straight and the opposite ends are attached to the opposite corners 34 of the frame assembly 36. The straps 18 are fastened at corners 34 of the frame assembly 36 as in known in the art. The devices 10 are then installed over the straps 18 and between framing elements 40 and then secured to the straps 18 as described below. The straps 18 are installed to inhibit shearing or racking of the frame assembly 36 due to imposed loads such as indicated by reference numeral 38. It is recognized that the assembly 36 could also be adapted to construction of floor assemblies (not shown). It is also recognized that multiple devices 10 could be installed on one respective strap 18, if desired. Further, a series of holes 19 can be preformed on the strap 18 to accommodate placement of the devices 10 on the straps 18 in predetermined locations, rather than using self tapping screws as compared to machine screws.

Referring to FIG. 4, initial installation of the strap 18 adjacent to framing elements 40, such as but not limited to those used in light steel frame construction, can result in forming pockets 42 of slack strap material between the elements 40. These pockets 42 of strap material can reduce the effectiveness of the straps 18 in inhibiting the induced loads 38. Referring to FIG. 1b, the separation distance of the opposed members 14 is preferably sufficient so as to accommodate the width of the strap 18, so as to permit positioning the strap 18 within the interior 15 of the device 10 prior to inserting the strap 18 in the slots 16. Therefore, once the strap 18 is initially positioned within interior of the device 10, the device 10 can be rotated counterclockwise with respect to the strap 18 so as to insert the sidewalls of the strap 18 through the entrances 26 of the slots 16. Further counterclockwise rotation of the device 10 with respect to the strap 18, approximately by an angle of 90 degrees, feeds the remaining strap 18 width through the entrances 26 so as to retain the strap 18 squarely within the slots 16. Subsequent initial clockwise rotation of the device 10 within the slots 16 will cause contact of the sidewalls of the strap 18 with the stops 32, as described above.

Referring to FIG. 5, respective devices 10 have been secured to each of the straps 18 by inserting the fastener 22 through the strap 18 and into the base 12 of the device 10. It is noted that tightening of the fastener 22 acts as a tightening element, which increases the tautness of the strap 18 by gathering excess or slack pockets 42 as gathered strap material 44 into the interior 15 between the base 12 and members 14 of the device 10 (see FIG. 6b) and thereby acts to remove or otherwise inhibit the formation of the strap pockets 42. Further, once the pockets 42 are removed in the strap 18 between the elements 40, further tightening of the fastener 22 produces tension in the strap 18.

Figure 9A:
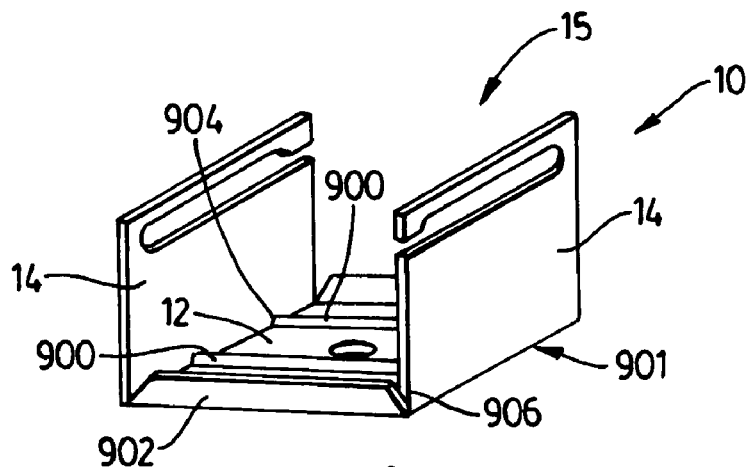

Referring to FIG. 9a, the device 10 can also have reinforcement elements 900 positioned on the base 12. The reinforcements 900 are for transferring bending forces and other experienced loadings from the base 12 to the members 14, so as to strengthen the base 12 to inhibit buckling or general structural integrity failure of the base 12. These loads can be static loads applied to the base 12 during application of the device 10 to the strap 18 (see FIG. 1b) and/or dynamic loads experienced during racking of the frame assembly 36 (see FIG. 3) once the device 10 is installed. These reinforcements 900 can be separate elements attached to the main body material (e.g. sheet metal stock) of the device 10, and/or be embossments formed during the manufacturing process of the device 10 (see FIG. 10). The reinforcements 900 preferably extend along the base 12 from one member 14 to the opposing member 14. Further, the reinforcements can be attached, or otherwise formed, directly at the ends 904 to both the base 12 and the adjacent member 14. It is recognised that the dimensions and placement of the reinforcements 900 on the base 12 are done so as to not inhibit the connection of the fastener 22 to the base 12, as well as to not inhibit or otherwise interfere with the positioning of the strap 18 within the interior 15 of the device 10 (see FIG. 6b). It is recognised that the reinforcements 900 can be positioned within the interior 15 and/or on the underside 901 of the base 12. It is further recognised that the reinforcements 900 can extend transversely across the base 12 with respect to the members 14 (as shown) or can extend diagonally (not shown), for example, across the base from one corner of the base 12 to the other corner of the base 12.

Referring again to FIG. 9a, the device 10 can also have additional tabs 902 formed as an extension of the base 12. The tabs 902 are for strengthening or otherwise reinforcing the base 12 to resist base loadings experienced by the device 10 during interaction with the strap 18. The tabs 902 extend at an angle with respect to the base 12, for example 90 degrees, and can either be an extension of the base 12 sheet material or a separate component attached to the base 12 sheet material, for example such as but not limited to welding. Further, the sides 906 of the tabs 902 can be connected to the adjacent members 14 so as to further assist in the transfer of the base 12 loadings to the members 14. It is noted that the tabs 902 can be used in combination with the reinforcements 900, if desired. It is recognised that the dimensions and placement of the tabs 902 on the base 12 are done so as to not inhibit the connection of the fastener 22 to the base 12, as well as to not inhibit or otherwise interfere with the positioning of the strap 18 within the interior 15 of the device 10 (see FIG. 6b). It is recognised that the tabs 902 can be positioned adjacent the interior 15 and/or projecting towards the underside 901 of the base 12.

Figure 9B:
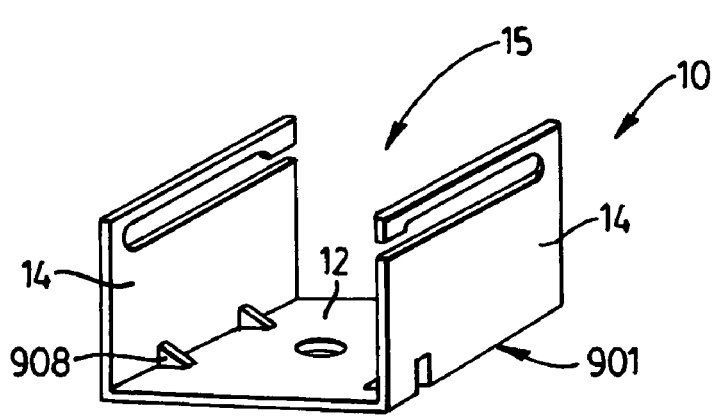

Referring to FIG. 9b, other reinforcements 908 can be used such that they are positioned both on the base 12 and attached to the adjacent respective member 14. These reinforcements 908 may not extend from member 14 to member 14 along the base 12, rather are used as reinforcements between the base 12 and the adjacent member 14. The reinforcements 908 can be used to help resist bending forces between the members 14 and the base 12, such that the manufactured angle between the base 12 and the members 14 is retained or otherwise inhibited from changing during operation of the device 10. For example, testing of the device 10 has shown under certain loading conditions that the distal ends of the members 14 bend away from the base 12, resulting in an angle greater that 90 degrees between the base 12 and member 14. This bending can contribute to integrity failure of the device 10 and in particular of the base 12. It is recognised that the dimensions and placement of the reinforcements 908 on the base 12 are done so as to not inhibit the connection of the fastener 22 to the base 12, as well as to not inhibit or otherwise interfere with the positioning of the strap 18 within the interior 15 of the device 10 (see FIG. 6b). It is recognised that the reinforcements 908 can be positioned within the interior 15 and/or on the underside 901 of the base 12. It is noted that the tabs 902 and/or reinforcements 900 can be used in combination with the reinforcements 908, if desired.

Referring to FIGS. 6a and 6b, operation of the device 10 once installed on the frame assembly 36 (see FIG. 3) first places the straps 18 in the slots 16 (see FIG. 1b), such that a portion of the strap 18 is placed in the interior 15. The fastener 22 is then inserted through the strap 18 and base 12 of the device 10 and tightened to gather excess strap material 44 into the interior 15 and also to produce a desired tension or tautness in the straps 18. An angle "A" between the members 14 and base 12 preferably remain approximately 90° to resist bending moments of the members 14 during tightening and thereby resists deformation of the device 10 that could result in decreasing induced tension in the strap 18. It is noted that device 10 operates to remove pockets 42 of slack strap material (see FIG. 5) and provide for installation of flat and substantially tensioned straps 18 as shown in FIG. 6b. The amount of tightening of the fastener 22 with respect to the base 12 can provide for tension control of the straps 18. It is recognized that with diagonally attached straps 18 (see FIG. 3), the device 10 can assist in squaring of the frame assembly 36.

Figure 7A:
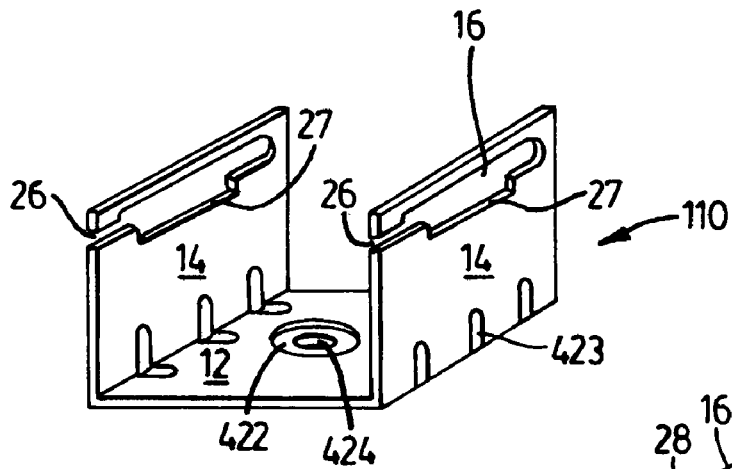
Figure 7B:
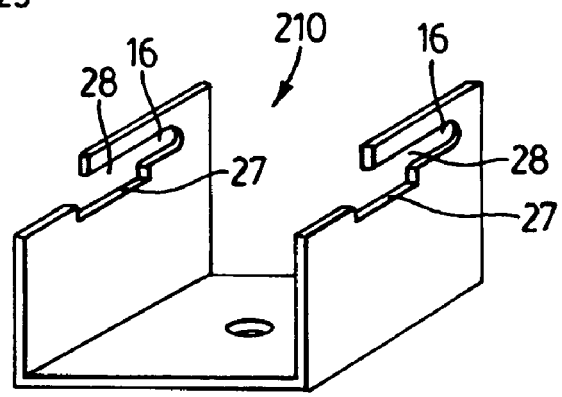
Figure 7C:
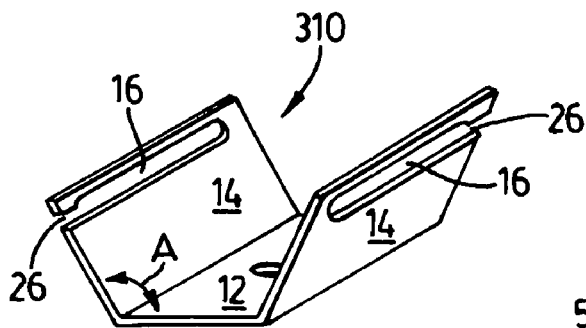
Figure 7D:
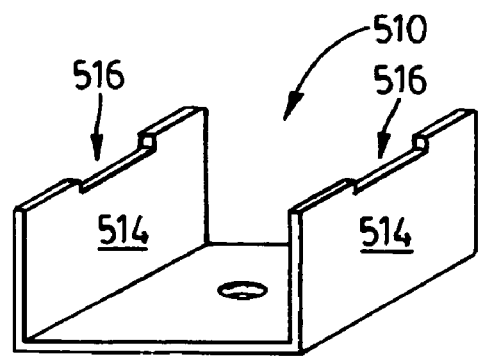

Referring to FIG. 10, an example manufacturing process 700 of the device 10 is provided. At step 702, a stock sheet material 600 is rolled to the desired thickness of the device 10 to accommodate expected forces experienced during operation. At step 704, punches 602 are used on the material 600 to make the slots 16 in the desired configuration (see FIG. 7a,b,c,d). At step 704, the sheet material 600 is bent so as to form the base 12 and the members 14. At step 706, tools 604, 606 and a die 608 can be used to form the reinforcements 900, 908 (for example). For example, the reinforcement 908 is formed as an embossment by tool punch 604 and the reinforcement 900 is formed as an embossment by tool punch 606. Once formed, individual devices 10 from the formed material 600 can be sheared at step 708 to produce the finished devices 10. It is recognised that additional or replacement reinforcement elements (i.e. tabs 902 and reinforcements 900, 908) can be added to the formed device 10 through mechanical attachment processes (e.g. welding). It is also recognised that a portion or all of the device could be made by a casting or molding process as is known in the art.

Referring to FIGS. 7a, 7b, 7c, and 7d, alternative embodiments of the device 10, namely 110, 210, 310, and 510 are shown. Device 110 has slots 16 which have entrances 26 situated on the same side for both of the members 14. Device 210 has shortened slots 16, such that the slot interior 28 does not extend for the full width of the strap 18 (not shown). Device 310 has slots 16 with opposing entrances 26, however, the angle A between the base 12 and the members 14 is greater than 90°. Device 510 has an open slot 516 in the distal end of each member 514 for accepting the strap 18 (not shown). Further, the device 110 can also have an embossed portion 422 to strengthen the region of the base 12 around a hole 424 to help reduce the tendency of the fastener 22 to pull out of the hole 424 when tightened. It is recognized that embossing 423 could also be used to strengthen other parts of the device 410 including but not limited to members 14a,b to help provide additional stiffening to reduce the tendency of the members to divide from desired angle A when the fastener 22 is tightened. Further, an indent 27 can be situated in each member 14 for positioning of the strap 18 (not shown).

Figure 8:
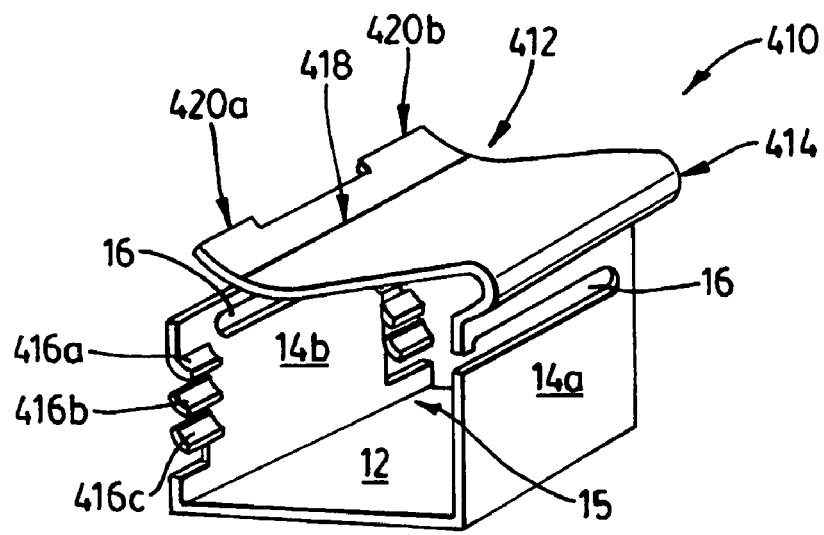

Referring to FIG. 8, an alternative device 410 has the base 12 with members 14a, 14b having opposing slots 16. The member 14*a* has a clamping arm 412 attached to the top by means of a flexible hinge 414. The member 14*b* has a series of tabs 416*a,b,c* positioned on either side and below the slot 16. The arm 412 has a fulcrum 418 for contacting the straps 18 (not shown) when inserted in the interior 15, whereby the arm 412 acts as the tightening element to induce collection of the strap 18.

In operation of the device 410, the arm 412 is depressed into the interior 15 such that the fulcrum 418 contacts the strap 18. Pressure is further applied to the arm 412 to force it into the interior 15, such that an edge 420*a* and of the arm 412 engages with the first set of tabs 416*a*, thus gathering excess material 44 of the strap 18 into the interior 15 and edge 420*b* contacts the strap 18. Subsequent depression of the arm 412, such that the edge 420*a* and engages tabs 416*b*, acts to increase the amount of material 44 of the strap 18 gathered in the interior 15 and thereby helps to increase the degree of tautness of the strap 18. It is noted that the orientation tabs of 416*a,b,c* allow the arm 412 to be depressed into position, yet retain the arm 412 once placed. Accordingly, the arm 412 acts as a tightening element to remove slack pockets 42 from the straps 18 and to develop varying degrees of tension tautness in the strap 18.

The devices 10, 110, 210, 310, 410 can be manufactured from 0.033 in and 0.044 in and 0.1 in steel roll stock with for example a 36 ksi yield strength. The roll stock can be Zn coated or Al—Zn coated or painted to resist corrosion. The devices 10, 110, 210, 310, 410 can be cold formed by bending a sheet of roll stock to the desired cross-sectional shape (see FIG. 1*a*), and the slots 16 and hole 20 can be punched or otherwise formed prior to and/or after forming. It is noted that the body (base 12, member 114) of the devices 10, 110, 210, 310, 410 are preferably manufactured from a requisite thickness of roll stock so as to promote primary failure in the straps 18 rather than the device 10, 110, 210, 310, 410. It is also noted that a washer (not shown), such as a concave or convex shaped washer, could be inserted between the strap 18 and the head of the fastener 22 to distribute stress loading there-between.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A kit for adjusting a degree of tautness of a strap, the kit comprising;

a tightening device comprising:

a base adapted for connecting to the strap;

a first member extending from a first side of the base;

a second member extending from a second side of the base, the members being in an opposed spaced apart relationship and cooperating with the base to define a device interior;

a first slot located in a distal end of the first member, the first slot adapted to receive the strap therein; and a second slot located in a distal end of the second member, the second slot adapted to receive the strap therein such that a length of the strap extends between the first slot and the second slot; and a fastener adapted to penetrate the thickness of the strap and retain the strap within the device interior by fixedly coupling the fastener to the base when in use, thereby coupling the strap to the base when in use to inhibit further movement of the strap across the base is inhibited such that the length of the strap extending between the slots is increased, wherein the fastener comprises a self-tapping screw adapted to form an aperture in the strap and the base.

2. The kit of claim 1, wherein the configuration of the members with respect to the base forms a U-shaped cross section.

3. The kit of claim 1 further comprising the strap.

4. The kit of claim 1 further comprising each of the slots having entrance at one end for directing the strap into an interior of the slot.

5. The kit of claim 4, wherein the width of the entrance is less than the width of the slot interior so as to provide an abutment adjacent to the entrance, the abutment for inhibiting the dislodgement of the strap.

6. The kit of claim 5 further comprising each of the slots having an abutment located at the other end of the slot for inhibiting rotation of the strap out of the slot interior once inserted therein.

7. The kit of claim 5, wherein the entrances are located on opposite sides of the respective members.

8. The kit of claim 1 further comprising a feature for facilitating the placement of a fastener to connect the strap to the base, the feature selected from the group consisting of a hole, a dimple and a marker positioned in the base.

* * * * *